US010644492B2

(12) United States Patent
Magno

(10) Patent No.: US 10,644,492 B2
(45) Date of Patent: May 5, 2020

(54) CART FOR STORING, TRANSPORTING, AND ORGANIZING A LONG ELECTRICAL CORD AND A PLURALITY OF ELECTRICAL OUTLETS

(71) Applicant: Ralph Carl Magno, Kissimmee, FL (US)

(72) Inventor: Ralph Carl Magno, Kissimmee, FL (US)

(*) Notice: Subject to any disclaimer, the term of this patent is extended or adjusted under 35 U.S.C. 154(b) by 379 days.

(21) Appl. No.: 15/783,641

(22) Filed: Oct. 13, 2017

(65) Prior Publication Data

US 2019/0115742 A1    Apr. 18, 2019

(51) Int. Cl.
| | | |
|---|---|---|
| *H02G 11/02* | (2006.01) | |
| *B65H 75/14* | (2006.01) | |
| *B65H 75/44* | (2006.01) | |
| *B65H 75/40* | (2006.01) | |

(52) U.S. Cl.
CPC ............ *H02G 11/02* (2013.01); *B65H 75/14* (2013.01); *B65H 75/403* (2013.01); *B65H 75/4428* (2013.01); *B65H 75/4465* (2013.01); *B65H 75/4494* (2013.01); *B65H 2402/412* (2013.01); *B65H 2701/34* (2013.01)

(58) Field of Classification Search
CPC ... H02G 11/02; B65H 75/403; B65H 2701/34
USPC ........................................................ 191/12.4
See application file for complete search history.

(56) References Cited

U.S. PATENT DOCUMENTS

| | | | | |
|---|---|---|---|---|
| 2,301,104 | A | * 11/1942 | Yost ................. | B65H 75/38 |
| | | | | 191/12.4 |
| 2,480,401 | A | * 8/1949 | Edwards .............. | H02G 11/02 |
| | | | | 191/12.4 |
| 2,908,453 | A | 10/1959 | Stiles | |
| 3,213,185 | A | 10/1965 | Petrick | |
| 3,369,084 | A | 2/1968 | Cook | |
| 3,536,275 | A | 10/1970 | Salomon | |

(Continued)

FOREIGN PATENT DOCUMENTS

| | | |
|---|---|---|
| CN | 203450972 U | 2/2014 |
| CN | 104003260 A | 8/2014 |

OTHER PUBLICATIONS

Website Link: http://www.homedepot.com/p/Designers-Edge-50-ft-14-3-Red-Cord-Reel-with-6-Outlets-E-235/100655281?MERCH=REC-_-PIPHorizontal1_rr-_-100661463-_-100655281-_-N Downloaded Mar. 18, 2017 50 ft. 14/3 Red Cord Reel with 6 Outlets.

(Continued)

*Primary Examiner* — Zachary L Kuhfuss

(57) ABSTRACT

A cart for storing and transporting an electrical cord of up to 500 feet in length to be unwound over a parcel of ground. The cart includes a cord spool having a pair of circular spool sides together bounding space for storing the electrical cord. The cart also has a plurality of female electrical sockets, a circuit breaker, a power on-off switch, a power-on indicator light, and a short male cord to plug into a power cord to provide power to the female electrical sockets. The cart also has a support frame to rotatably support the cord spool, and a pair of wheels to roll across the parcel of ground while supporting the electrical cord. Also included is a frame handle to enable a user to tilt the support frame onto the pair of wheels, and for pushing or pulling the cart over the ground while unwinding the electrical cord.

18 Claims, 7 Drawing Sheets

(56) References Cited

U.S. PATENT DOCUMENTS

| | | | |
|---|---|---|---|
| 3,733,478 A | 5/1973 | Barker | |
| 3,983,977 A * | 10/1976 | Crabb | B65H 75/406 |
| | | | 191/12.4 |
| 4,143,746 A * | 3/1979 | Lowery | H02G 11/02 |
| | | | 191/12.4 |
| 4,282,954 A | 8/1981 | Hill | |
| 4,338,497 A * | 7/1982 | Drew | H02G 11/02 |
| | | | 191/12.4 |
| 4,457,527 A | 7/1984 | Lowery | |
| 4,500,150 A * | 2/1985 | Leibensperger | H01R 13/72 |
| | | | 108/50.02 |
| 4,512,361 A * | 4/1985 | Tisbo | B65H 75/403 |
| | | | 137/355.27 |
| 4,520,239 A | 5/1985 | Schwartz | |
| 4,656,320 A | 4/1987 | Maddock | |
| 4,725,697 A | 2/1988 | Kovacik et al. | |
| 4,976,450 A | 12/1990 | Ellefson | |
| 5,014,371 A | 5/1991 | Heel | |
| 5,657,841 A * | 8/1997 | Morvan | H02G 11/02 |
| | | | 191/12.4 |
| 6,056,226 A | 5/2000 | Green | |
| 6,170,839 B1 | 1/2001 | Kizewski | |
| 6,218,796 B1 | 4/2001 | Kozlowski | |
| 6,254,251 B1 | 7/2001 | Washington | |
| 6,276,503 B1 * | 8/2001 | Laughlin, Jr. | B65H 75/403 |
| | | | 191/12.2 A |
| 6,779,749 B2 | 8/2004 | Laporta | |
| 7,017,603 B1 * | 3/2006 | Rosine | B65H 75/403 |
| | | | 137/342 |
| 7,931,389 B2 | 4/2011 | Suckle et al. | |
| 2004/0129523 A1 | 7/2004 | Cheung | |
| 2005/0072645 A1 | 4/2005 | Kovacik et al. | |
| 2006/0138270 A1 * | 6/2006 | Lichtscheidl | B65H 75/403 |
| | | | 242/396.1 |
| 2006/0186255 A1 * | 8/2006 | Rooker | B65H 75/40 |
| | | | 242/395 |
| 2007/0029746 A1 | 2/2007 | Brennan, Jr. | |
| 2008/0128543 A1 * | 6/2008 | Rumczikas | B65H 75/28 |
| | | | 242/403 |
| 2009/0096181 A1 | 4/2009 | Cole, Jr. et al. | |
| 2011/0197794 A1 | 8/2011 | Nunes | |
| 2014/0015487 A1 * | 1/2014 | Brown | B60L 3/0069 |
| | | | 320/109 |
| 2019/0115742 A1 * | 4/2019 | Magno | H02G 11/02 |

OTHER PUBLICATIONS

Website Link: https://www.alibaba.com/productdetail/Industrial-convienient-steel-cable-reels-with_60444215992.html Downloaded Mar. 18, 2017 Industrial Convenient Steel Cable Reels with Wheels.

Website Link: http://www.vestilmfg.com/products/ergosol/strapping_carts.htm Downloaded Mar. 18, 2017 Strapping Carts.

Website Link: https://www.pinterest.com/source/plansnow.com Downloaded Mar. 18, 2017 Rolling garage cart with shelves, hooks, outlets, & pegboard.

Website Link: https://www.buildconstructpros.com/tips-for-making-workshop-toolsportable#10 Downloaded Mar. 18, 2017 Cord Cart.

* cited by examiner

CART FOR STORING, TRANSPORTING, AND ORGANIZING A LONG ELECTRICAL CORD AND A PLURALITY OF ELECTRICAL OUTLETS

FIELD OF THE INVENTION

This invention relates generally to carts for transporting electrical cords, and more particularly to high capacity carts for transporting a long electrical cord and a plurality of electrical outlets.

BACKGROUND OF THE INVENTION

Reels are known that can be used to store a length of electrical cord. Some devices provide means for winding the cord onto a reel. Other devices also provide a handle for carrying the reel with the electrical cord wound upon the reel. However, such devices do not include outlets, or a circuit breaker, or an on/off switch.

For example, US 2008/0128543, filed Jun. 5, 2008 teaches an electrical cord winder. There are no outlets provided, and there is no on/off circuit breaker. Further, one must unwind the entire cord to use it.

Another example is US Patent Application 2006/0186255, filed Aug. 24, 2006, which teaches a reel that can be used to store and transport an electrical cord of up to 100 feet. However, even if it could store more than 100 feet of electrical cord, it would be too heavy to conveniently transport the electrical cord of more than 100 feet using this device because so much electrical cord would be too heavy for some people to carry over the ground due to its cumbersome weight.

SUMMARY OF THE INVENTION

The cart of the invention allows a typical person to store and transport a long length of electrical cord, such as a cord of up to 500 feet, just by pushing or pulling the cart over a parcel of ground as the cord unwinds off of a cord spool of the cart. The wheels are sized so as to roll effectively over the ground, and a handle is used to tilt the cart while it rolls over the ground. Once the cart has reached a desired point up to 500 feet from the starting point, one can return to the starting point and plug the electrical cord into a power receptacle so as to energize the electrical cord. The cart of the invention includes an on/off illuminated circuit breaker indicator so that one can determine whether the electrical outlets of the cart are energized. The on/off illuminated circuit breaker indicator is visible within at least 20 feet from the spool of the cart.

A general aspect of the invention is a cart for storing, transporting, and organizing an electrical cord of up to 500 feet in length to be unwound over a parcel of ground. The cart includes: a cord spool having a cylindrical hub with a circumference and an axis of rotation, and a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord; an electrical socket assembly, attached to at least one circular spool side, the electrical socket assembly having: a plurality of female electrical sockets, a wiring system connecting the plurality of female electrical sockets in parallel, also connecting an illuminated circuit breaker, power on-off switch, and a short male cord, configured to plug into a power cord so as to provide power to the plurality of female electrical sockets via the wiring system, and a power-on indicator light; a cord spool support frame including: a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length; and a frame handle, connected to the cord spool support frame, the frame handle being configured to enable a user to tilt the cord spool support frame onto the pair of wheels so as to facilitate pushing or pulling the cart over the parcel of ground while unwinding the electrical cord.

In some embodiments, the cart also includes a crank handle, attached to an end of the axis of rotation of the cylindrical hub, the crank handle being configured to facilitate rotation of the cord spool so as to wind the electrical cord of up to 500 feet in length onto the cord spool.

In some embodiments, the frame handle includes a telescoping handle mechanism that is configured to be collapsed and extended.

In some embodiments, the wiring system of the electrical socket assembly is configured for either 120 volts and 15 amps, or 240 volts and 8 amps.

In some embodiments, each wheel of the pair of wheels is at least 7 inches in diameter and at least 3 inches in width.

In some embodiments, the cord spool support frame further includes a locking mechanism configured to lock the cord spool so as to prevent the cord spool from rotating.

In some embodiments, the cord spool and the cord spool support frame are each made from one of: plastic, wood, or metal.

Another general aspect of the invention is a cart for storing and transporting an electrical cord of up to 500 feet in length to be unwound over a parcel of ground, where the cart has a cord spool that includes a cylindrical hub having a circumference and an axis of rotation, and a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord. The cart also has an electrical socket assembly, attached to at least one circular spool side, the electrical socket assembly including: a plurality of female electrical sockets, a wiring system connecting the plurality of female electrical sockets in parallel, also connecting an illuminated circuit breaker/power on-off switch, and a short male cord, configured to plug into a power cord so as to provide power to the plurality of female electrical sockets via the wiring system. The cart also has a cord spool support frame including a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length. The cart also has a frame handle, connected to the cord spool support frame, the frame handle being configured to enable a user to tilt the cord spool support frame onto the pair of wheels so as to facilitate pushing the cart over the parcel of ground while unwinding the electrical cord.

In some embodiments, the cart also includes a crank handle, attached to an end of the axis of rotation of the cylindrical hub, the crank handle being configured to facilitate rotation of the cord spool so as to wind the electrical cord of up to 500 feet in length onto the cord spool.

In some embodiments, the frame handle includes a telescoping handle mechanism that is configured to be collapsed and extended.

In some embodiments, the wiring system of the electrical socket assembly is configured for either 120 volts and 15 amps, or 240 volts and 8 amps.

In some embodiments, each wheel of the pair of wheels is at least 7 inches in diameter and at least 3 inches in width.

In some embodiments, the cord spool support frame further includes a locking mechanism configured to lock the cord spool so as to prevent the cord spool from rotating.

In some embodiments, the cord spool and the cord spool support frame are each made from one of: plastic, wood, or metal.

Another general aspect of the invention is a cart for storing and transporting an electrical cord of up to 500 feet in length to be unwound over a parcel of ground. This cart includes: a cord spool having a cylindrical hub having a circumference and an axis of rotation, and a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord. This cart also includes an electrical socket assembly, attached to at least one circular spool side, the electrical socket assembly having: a plurality of female electrical sockets, a wiring system connecting the plurality of female electrical sockets in parallel, also connecting a power on-off switch, and a short male cord, configured to plug into a power cord so as to provide power to the plurality of female electrical sockets via the wiring system. This cart also includes a cord spool support frame having a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length. This cart also includes a frame handle, connected to the cord spool support frame, the frame handle being configured to enable a user to tilt the cord spool support frame onto the pair of wheels so as to facilitate pushing the cart over the parcel of ground while unwinding the electrical cord.

In some embodiments, the cart also includes a crank handle, attached to an end of the axis of rotation of the cylindrical hub, the crank handle being configured to facilitate rotation of the cord spool so as to wind the electrical cord of up to 500 feet in length onto the cord spool.

In some embodiments, the frame handle includes a telescoping handle mechanism that is configured to be collapsed and extended.

In some embodiments, the wiring system of the electrical socket assembly is configured for either 120 volts and 15 amps, or 240 volts and 8 amps.

In some embodiments, each wheel of the pair of wheels is at least 7 inches in diameter and at least 3 inches in width.

In some embodiments, the cord spool support frame further includes a locking mechanism configured to lock the cord spool so as to prevent the cord spool from rotating.

In some embodiments, the cord spool and the cord spool support frame are each made from one of: plastic, wood, or metal.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
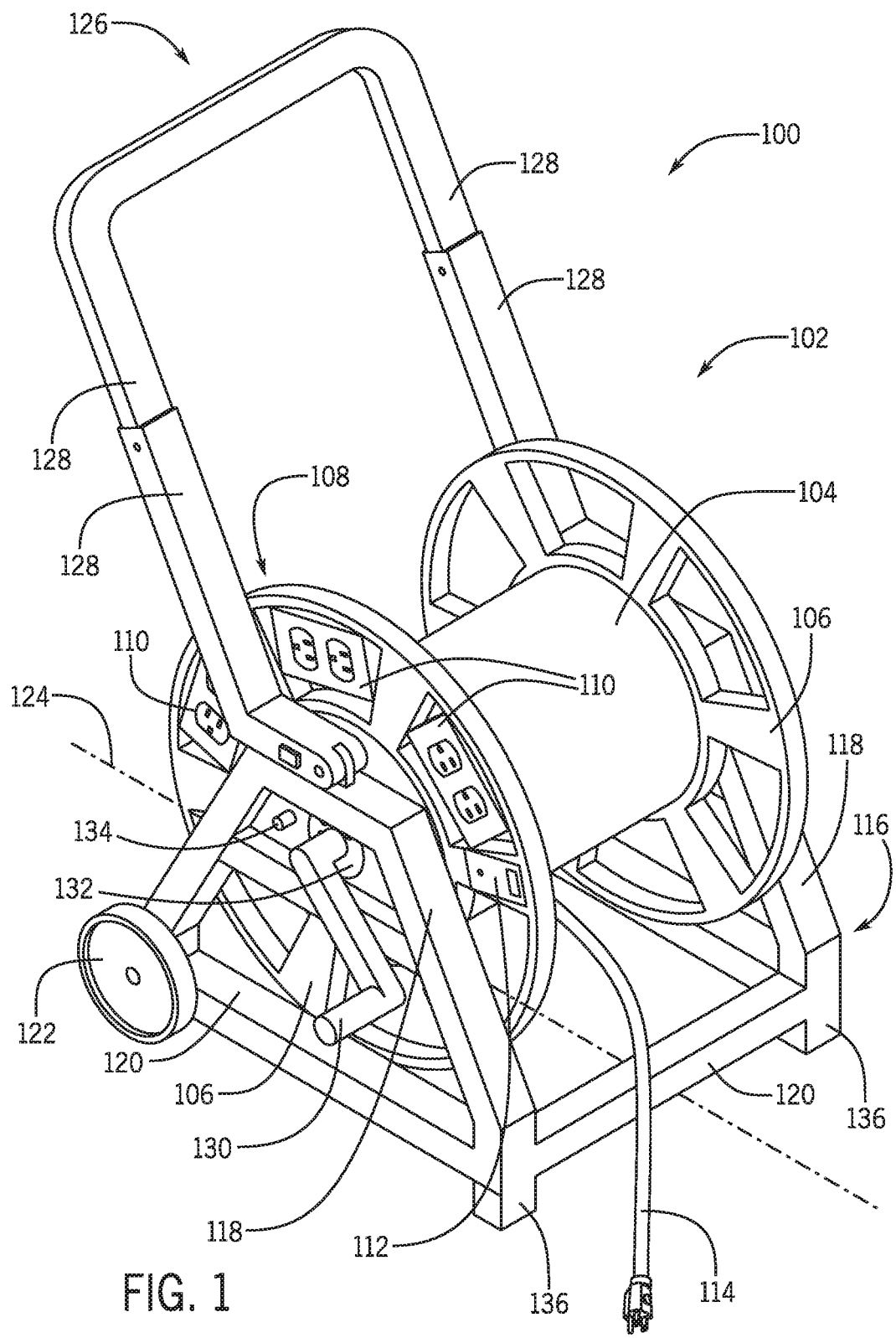
FIG. 1 is a perspective front view of the cart with the frame handle upright and extended.

FIG. 1 shows the cart 100, including a cylindrical cord spool 102 having a cylindrical hub 104, and a pair of circular spool sides 106. Attached to at least one circular spool side 106 is an electrical socket assembly 108 having at least a plurality of female electrical sockets 110, a power on-off switch 112, and a short male cord 114. A cord spool support frame 116 has a pair of frame sides 118, a set of cross members 120, and a pair of wheels 122. A frame handle 126 is connected to the cord spool support frame 116, and the frame handle 126 has a telescoping handle mechanism 128. A crank handle 130 is attached to an axle 132 of the cylindrical hub 104. The cord spool support frame 116 also can include a locking mechanism 134. The cord spool support frame 116 is supported by the pair of wheels 122 and the pair of feet 136, which rest on a parcel of ground 124.

The cart 100 is used to store, transport, and organize an electrical cord of up to 500 feet in length to be unwound over a parcel of ground 124. The cart 100 uses the cylindrical cord spool 102 to hold the electrical cord. The cylindrical cord spool 102 has the cylindrical hub 104 which is used to hold the initial length of an electrical cord winding as it is wound on the cylindrical cord spool 102. As more of the electrical cord is wound on the cylindrical cord spool 102, the pair of at least one circular spool side 106 are used to hold and organize the electrical cord winding within the cylindrical cord spool 102.

The cylindrical cord spool 102 also includes the electrical socket assembly 108 which is attached to the at least one circular spool side 106. The electrical socket assembly 108 has a plurality of female electrical sockets 110 which can be used to power electrical devices. The electrical socket assembly 108 also has a power on-off switch 112 which turns on or off the power to the plurality of female electrical sockets 110.

The electrical socket assembly 108 also has the short male cord 114, which is powered by connecting to a female end of the electrical cord winding.

The cylindrical cord spool 102 is supported by the cord spool support frame 116. The cord spool support frame 116 includes the pair of frame sides 118 and the set of cross members 120. In this embodiment, the cord spool support frame 116 is supported by the pair of wheels 122 and the pair of feet 136, which rest upon the parcel of ground 124.

In some embodiments, the pair of wheels 122 can be configured to be of a large enough size and width to roll across the parcel of ground 124 while supporting the electrical cord winding of up to 500 feet in length.

The cart 100 has a frame handle 126 for the user grasp while pushing or pulling the cart 100 across the parcel of ground 124.

In this embodiment, the frame handle 126 has a telescoping handle mechanism 128 configured to be collapsed or extended.

In some embodiments, the frame handle 126 can be configured to enable the user to tilt the cord spool support frame 116 onto the pair of wheels 122 so as to facilitate pushing or pulling the cart 100 over the parcel of ground 124 while unwinding the electrical cord.

In this embodiment, the crank handle 130 is connected to the cylindrical cord spool 102 at the axel 132, and the crank handle 130 is configured to help rotation of the cylindrical cord spool 102 so as to wind an electrical cord of up to 500 feet in length onto the cylindrical cord spool 102.

In this embodiment, the cord spool support frame 116 includes a locking mechanism 134 configured to lock the cylindrical cord spool 102 so as to prevent the cylindrical cord spool 102 from rotating, thereby preventing the cord from unwinding.

Figure 2:
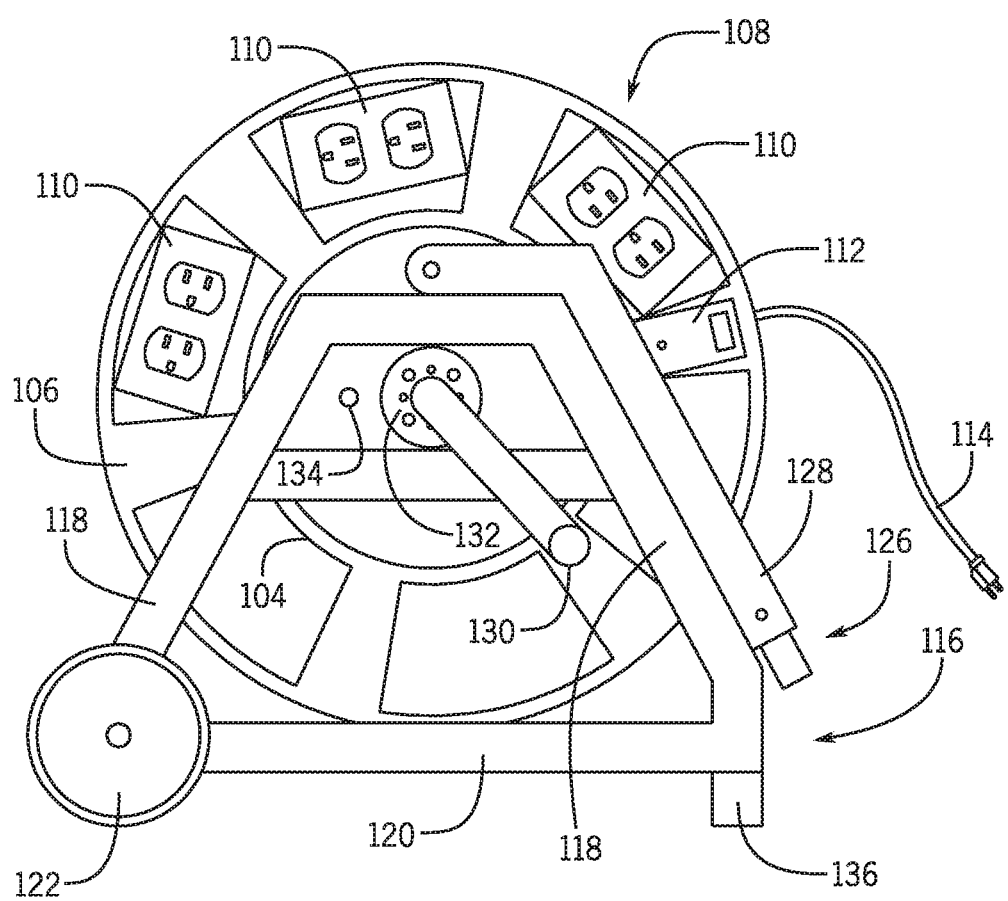
FIG. 2 is a side view of the cart with the frame handle in the collapsed position.

FIG. 2 shows the cart 100 having a cylindrical hub 104, one circular spool side 106, and an electrical socket assembly 108 having a plurality of female electrical sockets 110, a power on-off switch 112, and a short male cord 114. The cord spool support frame 116 has a pair of frame sides 118, a set of cross members 120, and a pair of wheels 122. The frame handle 126 has a telescoping handle mechanism 128. The crank handle 130 is attached to the axel 132. Also shown again is the locking mechanism 134, and one foot of the pair of feet 136.

The circular spool side 106 supports the electrical socket assembly 108. The electrical socket assembly 108 has a plurality of female electrical sockets 110 which are used to power electrical devices. The electrical socket assembly 108 also includes a power on-off switch 112 which turns on or off the power to the plurality of female electrical sockets 110. The electrical socket assembly 108 also has the short male cord 114, which is powered by connecting it to a female end of the electrical cord winding. The electrical cord winding is wound on the cylindrical hub 104, between the pair of circular spool sides 106. The cylindrical hub 104 is supported by the cord spool support frame 116.

One side of the cord spool support frame 116 is shown. This side of the cord spool support frame 116 includes one of the pair of frame sides 118 and one of the set of cross members 120. In this embodiment, the cord spool support frame 116 is supported by the pair of wheels 122 (one is shown), and the pair of feet 136 (one is shown).

In this view, the frame handle 126 is shown in a folded position, and the telescoping handle mechanism 128 is shown in a collapsed position.

In this embodiment, the crank handle 130 is connected to the axel 132, and the crank handle 130 is configured to facilitate rotation of the cylindrical cord spool so as to wind the electrical cord of up to 500 feet in length onto the cylindrical cord spool.

In this embodiment, the cord spool support frame 116 includes a locking mechanism 134 configured to lock the cylindrical cord spool so as to prevent the cylindrical cord spool from rotating.

Figure 3:
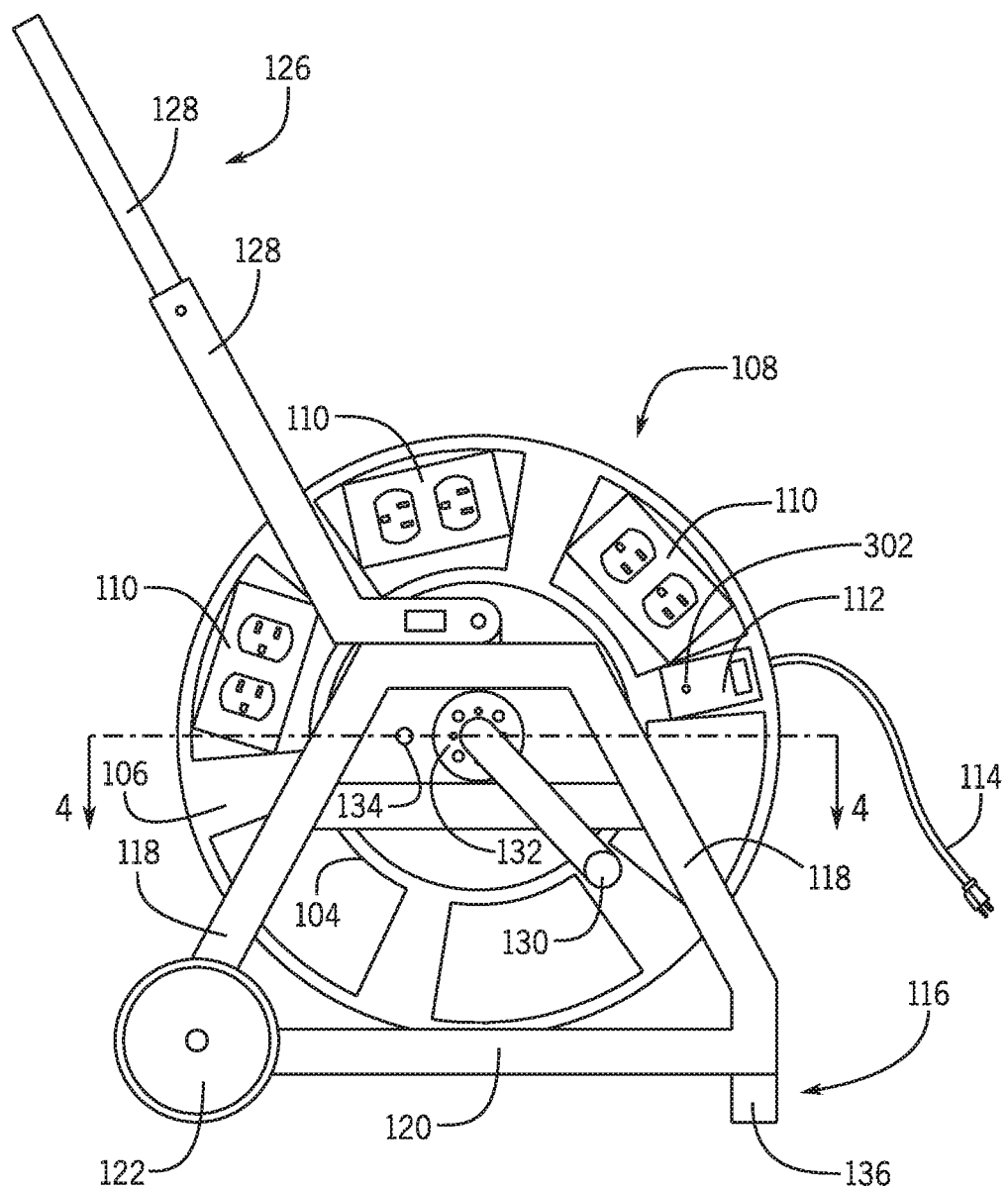
FIG. 3 is a side view of the cart with the frame handle upright and extended.

FIG. 3 again shows the cart 100 having a cylindrical hub 104 having two circular spool sides 106 (showing only one in this view), and an electrical socket assembly 108 having a plurality of female electrical sockets 110, a power on-off switch 112, and a short male cord 114. Also shown is the cord spool support frame 116 having a pair of frame sides 118 (only one is shown in this view), a set of cross members 120. Also connected to the cord spool support frame 116 is the frame handle 126, having a telescoping handle mechanism 128. The crank handle 130 is attached to an end of the axel 132. The locking mechanism 134 prevents the cylindrical hub 104 from rotating. The pair of feet 136 and the wheels 122 rest on the ground. In this view, a power-on indicator light 302 is shown, which is cooperative with the power on-off switch 112.

One of the circular spool sides 106 supports the electrical socket assembly 108. The electrical socket assembly 108 has a plurality of female electrical sockets 110 which can be used to power electrical devices plugged into the sockets 110. The electrical socket assembly 108 also has a power on-off switch 112 which turns on or off the power to the plurality of female electrical sockets 110.

In this embodiment, the power on-off switch 112 also has a power-on indicator light 302 which becomes illuminated when the power is turned on.

The electrical socket assembly 108 also has the short male cord 114, which is powered by connecting to a female end of the electrical cord winding. The electrical cord winding is wound on the cylindrical hub 104, between the pair of circular spool side 106. The cylindrical hub 104 is supported by the cord spool support frame 116.

One side of the cord spool support frame 116 is shown. The cord spool support frame 116 includes a pair of frame sides 118 (one frame side is shown in this view) and one of the set of cross members 120. In this embodiment, the cord spool support frame 116 is supported by the pair of wheels 122 (one is shown), and the pair of feet 136 (one is shown).

In this view, the frame handle 126 is shown in an unfolded, extended position, and the telescoping handle mechanism 128 is shown in an extended position.

In this embodiment, the crank handle 130 is connected to and end of the axel 132, and the crank handle 130 is configured to facilitate rotation of the cylindrical cord spool so as to wind the electrical cord of up to 500 feet in length onto the cylindrical cord spool.

In this embodiment, the cord spool support frame 116 includes a locking mechanism 134 configured to lock the cylindrical cord spool so as to prevent the cylindrical cord spool from rotating.

Figure 4:
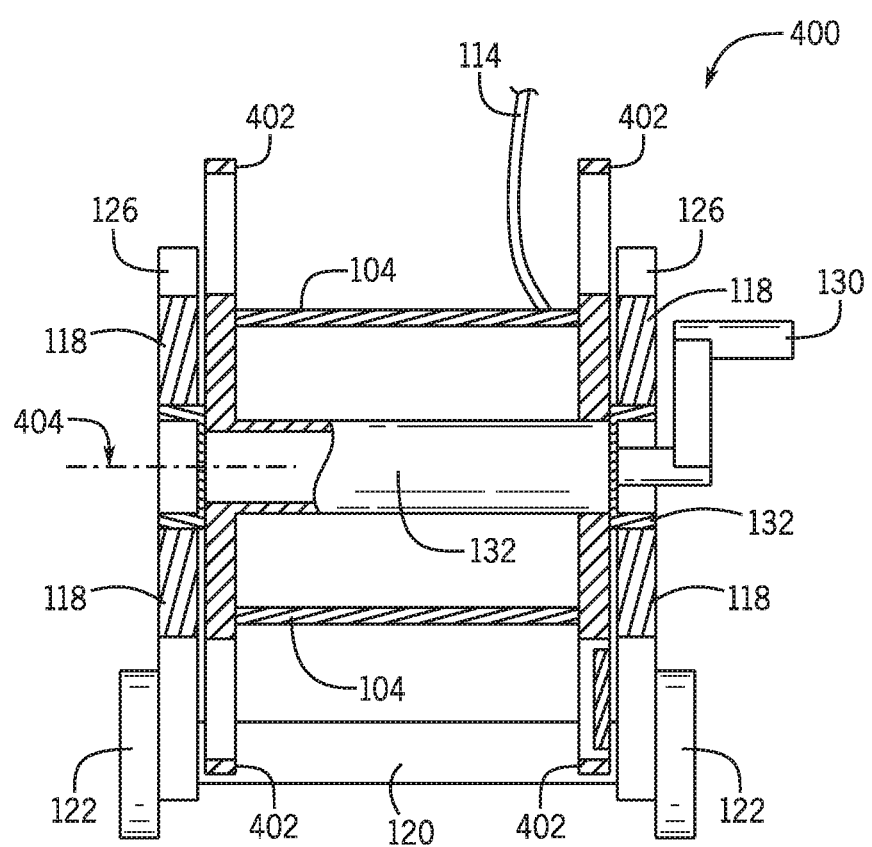
FIG. 4 is a cross-sectional and cutaway rear view of the cart.

FIG. 4 shows a cross-sectional and cutaway rear view of the cart 100, showing the cylindrical hub 104, the short male cord 114, the pair of frame sides 118, the set of cross members 120, the pair of wheels 122, the frame handle 126, the crank handle 130, the axel 132, an outer circumference of circular spool sides 402, and an axis of rotation 404.

The cylindrical hub 104 and the pair of frame sides 118 form a region that holds the electrical cord winding. The outer diameter of the pair of frame sides 118 is the pair of outer circumferences of the circular spool sides 402. The cutaway view of the axle 132 shows the axis of rotation 404 of the cylindrical hub 104, and the axis of rotation 404 of the pair of frame sides 118.

In this embodiment, the crank handle 130 is connected to the axel 132, and the crank handle 130 is configured to facilitate rotation of the cylindrical hub 104 so as to wind the electrical cord of up to 500 feet in length onto the cylindrical cord spool.

In this embodiment, the pair of wheels 122 supports the pair of frame sides 118 and the set of cross members 120.

In this view, the frame handle 126 is shown in a folded position.

Figure 5:
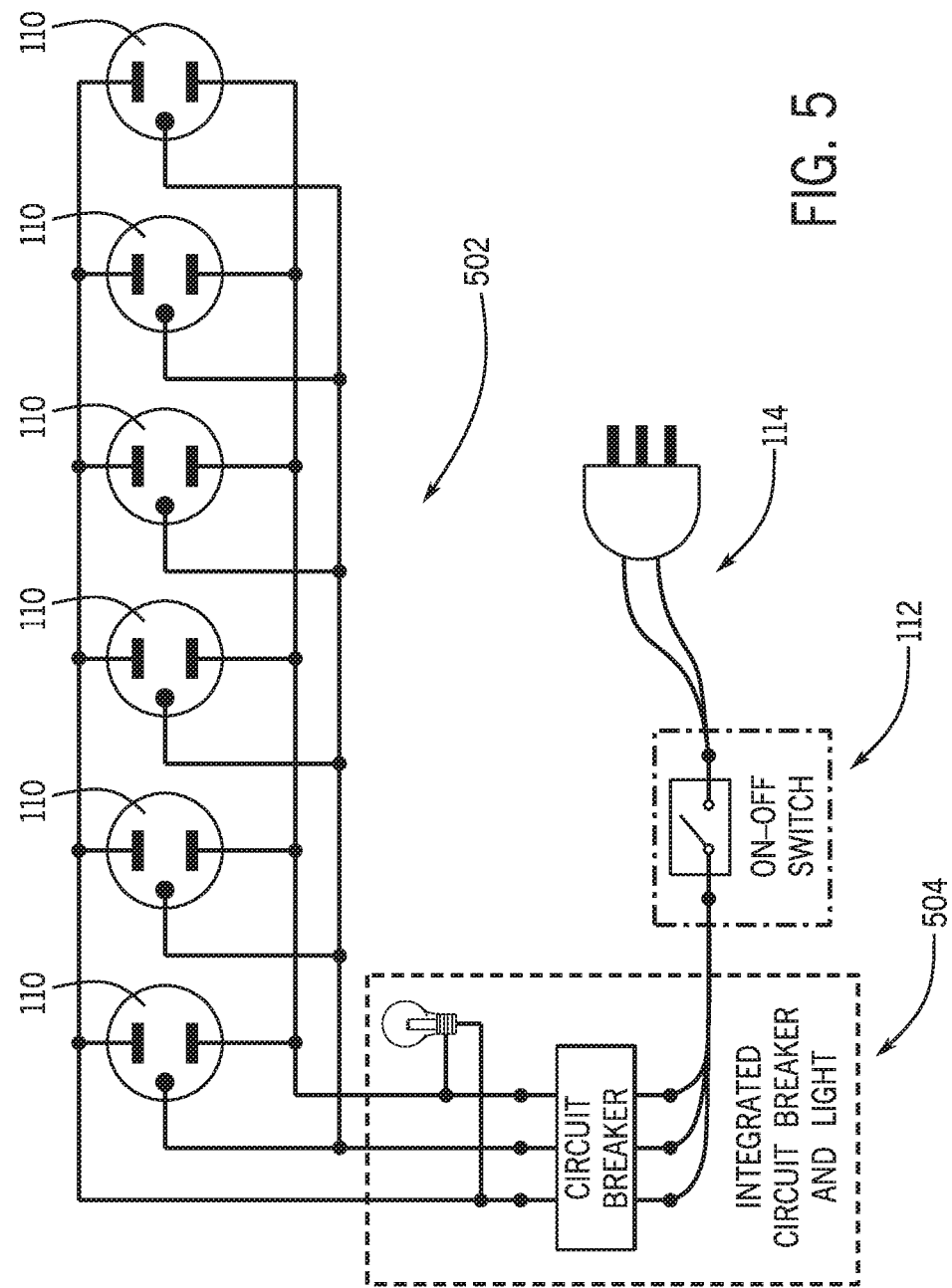
FIG. 5 is an electrical circuit diagram showing the electrical socket assembly having a power on-off switch and a combined circuit breaker/power-on indicator light.

FIG. 5 shows an electrical socket assembly having a plurality of female electrical sockets 110, cooperative with a power on-off switch 112, which is connected to a short male cord 114. A wiring system 502 is connected to a combined circuit breaker/power-on indicator light 504, the wiring system 502 also serving to connect in parallel the plurality of female electrical sockets 110.

Thus, in this embodiment, the electrical socket assembly includes: the plurality of female electrical sockets 110, the power on-off switch 112, the short male cord 114, the wiring system 502, and the combined circuit breaker/power-on indicator light 504.

Figure 6:
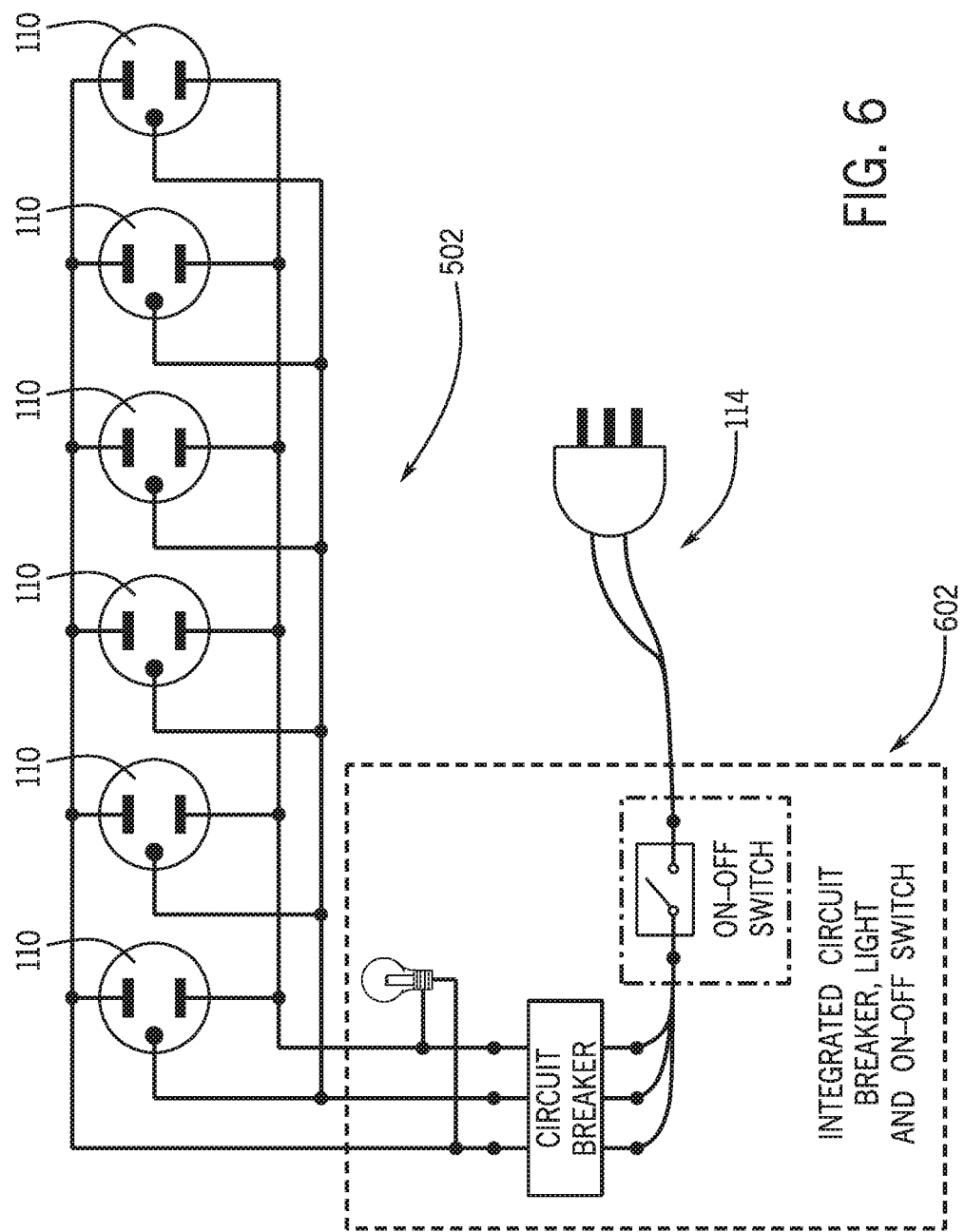
FIG. 6 is an electrical circuit diagram showing the electrical socket assembly with a combined circuit breaker/power-on indicator light/power on-off switch.

FIG. 6 shows an electrical socket assembly having a plurality of female electrical sockets 110 connected in parallel by the wiring system 502; a short male cord 114; and a combined circuit breaker/power-on indicator light/power on-off switch 602.

Thus, in this embodiment, the electrical socket assembly includes: the plurality of female electrical sockets 110, the short male cord 114, the wiring system 502, and the combination circuit breaker/power-on indicator light/power on-off switch 602.

Figure 7:
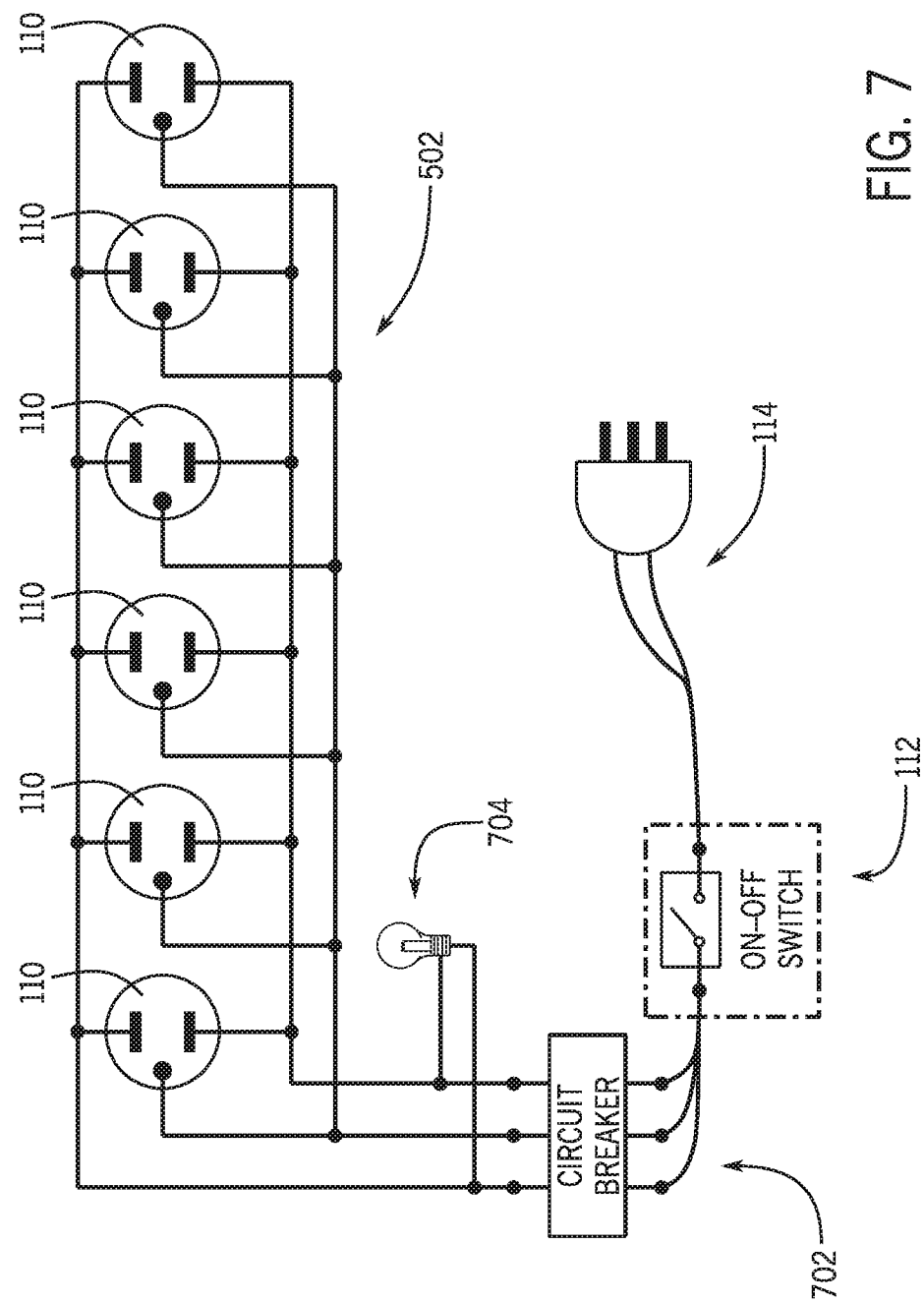
FIG. 7 is an electrical circuit diagram showing the electrical socket assembly with separate power on-off switch, circuit breaker, and power-on indicator light.

FIG. 7 shows an electrical socket assembly having a plurality of female electrical sockets 110, a short male cord 114, a wiring system 502, a separate power-on indicator light 704, a separate circuit breaker 702, and a separate power on-off switch 112.

Thus, in this embodiment, an electrical socket assembly includes: the plurality of female electrical sockets 110, the short male cord 114, the wiring system 502, the power on-off switch 112, the circuit breaker 702, and the power-on indicator light 704.

Other modifications and implementations will occur to those skilled in the art without departing from the spirit and the scope of the invention as claimed. Accordingly, the above description is not intended to limit the invention, except as indicated in the following claims.

What is claimed is:

1. A cart for storing and transporting an electrical cord of up to 500 feet in length to be unwound over a parcel of ground, the cart comprising:
    a cord spool, including:
        a cylindrical hub having a circumference and an axis of rotation, and
        a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord;
    an electrical socket assembly, attached to at least one circular spool side, the electrical socket assembly including:
        a plurality of female electrical sockets, a wiring system connecting the plurality of female electrical sockets in parallel, also connecting a circuit breaker, a power on-off switch, and a short male cord, configured to plug into a power cord so as to provide power to the plurality of female electrical sockets via the wiring system, and a power-on indicator light;
    a cord spool support frame including:
        a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length; and
    a frame handle, connected to the cord spool support frame, the frame handle being configured to enable a user to tilt the cord spool support frame onto the pair of wheels so as to facilitate pushing or pulling the cart over the parcel of ground while unwinding the electrical cord, wherein the frame handle includes a telescoping handle mechanism that is configured to be collapsed and extended, and the frame handle includes a pivot configured to fold the frame handle onto the frame sides.

2. The cart of claim 1, further comprising:
    a crank handle, attached to an end of the axis of rotation of the cylindrical hub, the crank handle being configured to facilitate rotation of the cord spool so as to wind the electrical cord of up to 500 feet in length onto the cord spool.

3. The cart of claim 1, wherein the wiring system of the electrical socket assembly is configured for either 120 volts and 15 amps, or 240 volts and 8 amps.

4. The cart of claim 1, wherein each wheel of the pair of wheels is at least 7 inches in diameter and at least 3 inches in width.

5. The cart of claim 1, wherein the cord spool support frame further includes:
    a locking mechanism configured to lock the cord spool so as to prevent the cord spool from rotating.

6. The cart of claim 1, wherein the cord spool and the cord spool support frame are each made from one of: plastic, wood, or metal.

7. A cart for storing and transporting an electrical cord of up to 500 feet in length to be unwound over a parcel of ground, the cart comprising:
    a cord spool, including:
        a cylindrical hub having a circumference and an axis of rotation, and
        a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord;
    an electrical socket assembly, attached to at least one circular spool side, the electrical socket assembly including:
        a plurality of female electrical sockets, a wiring system connecting the plurality of female electrical sockets in parallel, also connecting a circuit breaker, a power on-off switch, and a short male cord, configured to plug into a power cord so as to provide power to the plurality of female electrical sockets via the wiring system;
    a cord spool support frame including:
        a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length; and
    a frame handle, connected to the cord spool support frame, the frame handle being configured to enable a user to tilt the cord spool support frame onto the pair of wheels so as to facilitate pushing the cart over the parcel of ground while unwinding the electrical cord, wherein the frame handle includes a telescoping handle mechanism that is configured to be collapsed and extended, and the frame handle includes a pivot configured to fold the frame handle onto the frame sides.

8. The cart of claim 7, further comprising:
a crank handle, attached to an end of the axis of rotation of the cylindrical hub, the crank handle being configured to facilitate rotation of the cord spool so as to wind the electrical cord of up to 500 feet in length onto the cord spool.

9. The cart of claim 7, wherein the wiring system of the electrical socket assembly is configured for either 120 volts and 15 amps, or 240 volts and 8 amps.

10. The cart of claim 7, wherein each wheel of the pair of wheels is at least 7 inches in diameter and at least 3 inches in width.

11. The cart of claim 7, wherein the cord spool support frame further includes:
a locking mechanism configured to lock the cord spool so as to prevent the cord spool from rotating.

12. The cart of claim 7, wherein the cord spool and the cord spool support frame are each made from one of: plastic, wood, or metal.

13. A cart for storing and transporting an electrical cord of up to 500 feet in length to be unwound over a parcel of ground, the cart comprising:
a cord spool, including:
  a cylindrical hub having a circumference and an axis of rotation, and
  a pair of circular spool sides, each extending radially from the circumference of the cylindrical hub, the circular spool sides being at opposite ends of the cylindrical hub, the pair of circular spool sides and the cylindrical hub together bounding space for storing a winding of up to 500 feet of the electrical cord;
an electrical socket assembly, attached to at least one circular spool side, the electrical socket assembly including:
  a plurality of female electrical sockets, a wiring system connecting the plurality of female electrical sockets in parallel, also connecting an circuit breaker, and a short male cord, configured to plug into a power cord so as to provide power to the plurality of female electrical sockets via the wiring system;
a cord spool support frame including:
  a pair of frame sides configured to rotatably support the cord spool, a set of cross members configured to connect the pair of frame sides, and a pair of wheels, at least one wheel mounted on each frame side, the pair of wheels being configured to roll across the parcel of ground while supporting the electrical cord of up to 500 feet in length; and
a frame handle, connected to the cord spool support frame, the frame handle being configured to enable a user to tilt the cord spool support frame onto the pair of wheels so as to facilitate pushing the cart over the parcel of ground while unwinding the electrical cord, wherein the frame handle includes a telescoping handle mechanism that is configured to be collapsed and extended, and the frame handle includes a pivot configured to fold the frame handle onto the frame sides.

14. The cart of claim 13, further comprising:
a crank handle, attached to an end of the axis of rotation of the cylindrical hub, the crank handle being configured to facilitate rotation of the cord spool so as to wind the electrical cord of up to 500 feet in length onto the cord spool.

15. The cart of claim 13, wherein the wiring system of the electrical socket assembly is configured for either 120 volts and 15 amps, or 240 volts and 8 amps.

16. The cart of claim 13, wherein each wheel of the pair of wheels is at least 7 inches in diameter and at least 3 inches in width.

17. The cart of claim 13, wherein the cord spool support frame further includes:
a locking mechanism configured to lock the cord spool so as to prevent the cord spool from rotating.

18. The cart of claim 13, wherein the cord spool and the cord spool support frame are each made from one of: plastic, wood, or metal.

* * * * *